United States Patent [19]

Odaka et al.

[11] 4,401,929

[45] Aug. 30, 1983

[54] CONTROL APPARATUS OF AUTOMATIC DOOR

[75] Inventors: Kuniyuki Odaka; Yukio Yamamura; Koichi Ishino, all of Hikone; Masayuki Nakamura, Kadoma, all of Japan

[73] Assignee: Matsushita Electric Works, Ltd., Osaka, Japan

[21] Appl. No.: 281,378

[22] Filed: Jul. 8, 1981

[30] Foreign Application Priority Data

Jul. 15, 1980 [JP] Japan ................................ 55-097283

[51] Int. Cl.[3] ................................................ H02P 3/00

[52] U.S. Cl. ........................................ 318/466; 318/266

[58] Field of Search ............... 318/603, 626, 283, 285, 318/286, 364, 365, 369, 385, 368, 445, 446, 466, 467, 468, 470, 264–266

[56] References Cited

U.S. PATENT DOCUMENTS 4,006,392 2/1977 Catlett ................................ 318/283

*Primary Examiner*—B. Dobeck

*Assistant Examiner*—A. Evans

*Attorney, Agent, or Firm*—Birch, Stewart, Kolasch & Birch

[57] ABSTRACT

A control apparatus of an automatic door is adapted such that a time period required for opening a door to a full-opened state is stored and a target time period required for opening the door to a half-opened state or to a ¾-opened state is determined by evaluating the stored time period for opening the door to a full-opened state. In an operation mode for opening the door to a half-opened state or a ¾-opened state, comparison is made of a lapse time period of the current operation for opening the door and the target time period is calculated, in advance whereupon a motor is brought to a stop upon coincidence thereof.

12 Claims, 7 Drawing Figures

CONTROL APPARATUS OF AUTOMATIC DOOR

BACKGROUND OF THE INVENTION

1. Field of the Invention

The present invention generally relates to a control apparatus of an automatic door. More specifically, the present invention relates to a control apparatus of an automatic door in which the opening amount of the door can be changed.

2. Description of the Prior Art

A conventional automatic door has been generally structured such that an opened amount is predetermined, which is usually the amount for a full-opened state. Therefore, each time a door is opened cooled air or warmed air generated by an air-conditioning apparatus in a building is dissipated outside the building. As a result, the recent demand of energy savings has not been fully met. Therefore, previously the present inventors have proposed a control apparatus of a door in which a maximum opening amount of a door can be changed not only to that for a full-opened state but also to that for a half-opened state. However, the previously proposed automatic door which constitutes the background of the present invention comprises two position detecting sensors such as reed switches for detecting positions where a door is to be stopped in opening the same, in order to detect such positions for full-opened state and half-opened state such that one of them is selectively enabled to control an opening amount of such as a full-opened state or a half-opened state. Therefore, with such background technology, it is required to provide a plurality of reed switches for detecting stop positions, which necessitates an increased number of components and hence makes the structure complicated and makes installation troublesome.

The above described previously proposed background technology further involves a disadvantage that when an abnormal load is applied to a door in opening the door to a half-opened state no brake cannot be applied to the door, which could result in damage of the door eventually. The reason is that in the case where a door is to be half-opened those reed switches to be enabled in opening the door to a full-opened state have been disabled as a matter of course. More specifically, if and when those reed switches to be enabled in opening a door to a full-opened state are enabled the fact that the door was opened to a full-opened state by an abnormal load is detected, whereupon a brake is applied to the door. However, in such a case where only the reed switch for opening a door to a half-opened state is enabled, a door being about to be opened to a full-opened state cannot be subject to a brake function eventually inasmuch as no means for detecting the same has been provided.

SUMMARY OF THE INVENTION

Briefly described, the present invention comprises a control apparatus of an automatic door, wherein a target time period associated with a half-opened state of a $\frac{3}{4}$-opened state is or other opened state based on a time period required for opening a door to a full-opened state, whereupon a motor for driving a door is energized or de-energized based on the evaluated target time period. According to the present invention, any particular position detector for controlling the opening amount such as a half-opened state, a $\frac{3}{4}$-opened state and the like other than a full-opened state need not be provided, with the result that a door can be opened or closed with any opening amount with ease. Therefore, excessive components for detecting positions can be dispensed with and accordingly a structure is simplified as compared with the aforementioned structure while installation is also facilitated. In addition, determination of such time period, evaluation of a target time period and comparison of the target time period and the lapse time period can be carried out using an electronic circuit configuration such as a microprocessor and accordingly the reliability of the apparatus is improved as compared with a case where similar control is achieved using a conventional mechanical detecting and controlling means. Furthermore, employment of mere time control without recourse to such mechanical detecting and controlling means makes it possible to control an opening amount in a continuous or non-step manner and to set any desired opening amount with ease, as compared with a case where such mechanical detecting and controlling means is employed.

In a preferred embodiment of the present invention, means for detecting the position of a door is provided at a full-opened position and the detecting means is always enabled even in any mode such as a half-opening mode other than a full-opening mode. Therefore, even if an abnormal load is applied to a door and a door is forcedly brought to a full-opened state while the door is in a half-opened state or a $\frac{3}{4}$-opened state, an accident such as damage of the door is prevented from occurring. The reason is that since the detecting means has been normally enabled and such can be detected even if the door is forcedly brought to a full-opened state, a brake is accordingly applied to a motor in response thereto.

In another preferred embodiment of the present invention, the number of persons passing by a door within a predetermined period of time in the past is detected as a function of a detection signal from a sensor for detecting proximity or passage of a member being detected to or by a door. In the case where the number of passing persons is larger than a predetermined reference value, the door is opened or closed in a full-opening mode, whereas in the case where the number of persons is smaller than the reference value the door is controlled to an opening mode other than a full-opening mode such as to an opening amount smaller than a full-opened state. According to the preferred embodiment, a situation where the door is opened to a full-opened state in spite of a decreased number of persons passing by the door is decreased as much as possible. Accordingly, energy for air-conditioning in a building is reduced as much as possible from being dissipated undesirably outside the building. Therefore, a recent demand of energy savings can be more fully satisfied. Such automatic setting or control as described above for an opening amount of a door can be made only in a desired time zone using a timer, for example, based on the past statistics obtained in advance.

Accordingly, a principal object of the present invention is to provide a control apparatus of an automatic door, in which the structure is simple and accordingly installation is easy, while the maximum opening amount of a door can be controlled arbitrarily and with certainty.

An aspect of the present invention resides in a control apparatus of an automatic door, wherein the maximum opening amount of a door is controlled based on the lapse time period from the start of an opening operation.

Another aspect of the present invention resides in a control apparatus of an automatic door, wherein the maximum opening amount can be automatically set in accordance with the number of persons passing by the door.

A further aspect of the present invention resides in a control apparatus of an automatic door, wherein the maximum opening amount of the door is automatically set and is controlled for each time zone by the use of timer means.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
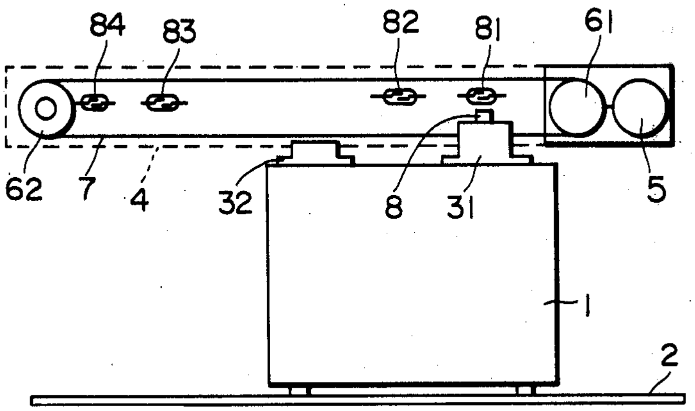
FIG. 1 is a diagrammatic view showing an outline of the structure of one embodiment of the present invention.

FIG. 1 is a diagrammatic view showing the structure of one embodiment of the present invention. A door 1 is slideably provided on a rail 2 while the same is hung by means of suspending members 31 and 32 from a transom 4. A motor 5 is disposed one end of the transom 4. The output shaft of the motor 5 is coupled to a driving pulley 61 and a driven pulley 62 is provided at the other end of the transom 4 so as to be opposed to the driving pulley 61. An endless belt 7 is set between the driving pulley 61 and the driven pulley 62 and the above described suspending members 31 and 32 are connected to a portion of the belt 7. Accordingly, the door 1 is driven in the opening direction (the leftward direction as viewed in FIG. 1) or the closing direction (the rightward direction as viewed in FIG. 1) on the rail 2 as the belt 7 is moved in accordance with the rotation of the motor 5. In a preferred embodiment of the present invention, the belt 7 may be a toothed belt such as a timing belt, in which case the two pulleys 61 and 62 may also be toothed pulleys such as timing pulleys accordingly. The transom 4 is provided with reed switches 81, 82, 83 and 84 for detecting the position of the door 1. Any other type of sensor may be substituted for these reed switches. These reed switches 81 to 84 are arranged such that the reed switches 81 and 82 function as one set while the reed switches 83 and 84 function as another set, wherein the set of the reed switches 81 and 82 is utilized for controlling the stopping of the door when the same is closed while the set of the reed switches 83 and 84 is provided to correspond to a full-opened position of the door 1 to be used for controlling the stopping when the door is opened. More specifically, the reed switch 81 is aimed to detect the position for starting a so-called push operation at the final step in a closing operation of the door 1 while the reed switch 82 is aimed to detect the position for starting a braking operation in the course of the closing operation. On the other hand, the reed switch 83 is aimed to detect the position for starting the braking operation in the opening operation while the reed switch 84 is aimed to detect the position for stopping the door in the full-opening operation. These reed switches 81 to 84 are on/off contolled responsive to a magnet 8 which is moved together with the door 1. Accordingly, a control apparatus to be subsequently described is responsive to the signals from these reed switches 81 to 84 to control energization or de-energization of the motor 5. Meanwhile, in other embodiment the signals from the reed switches 82 and 83 are used of the zone for determining an opening operation time period.

Figure 2:
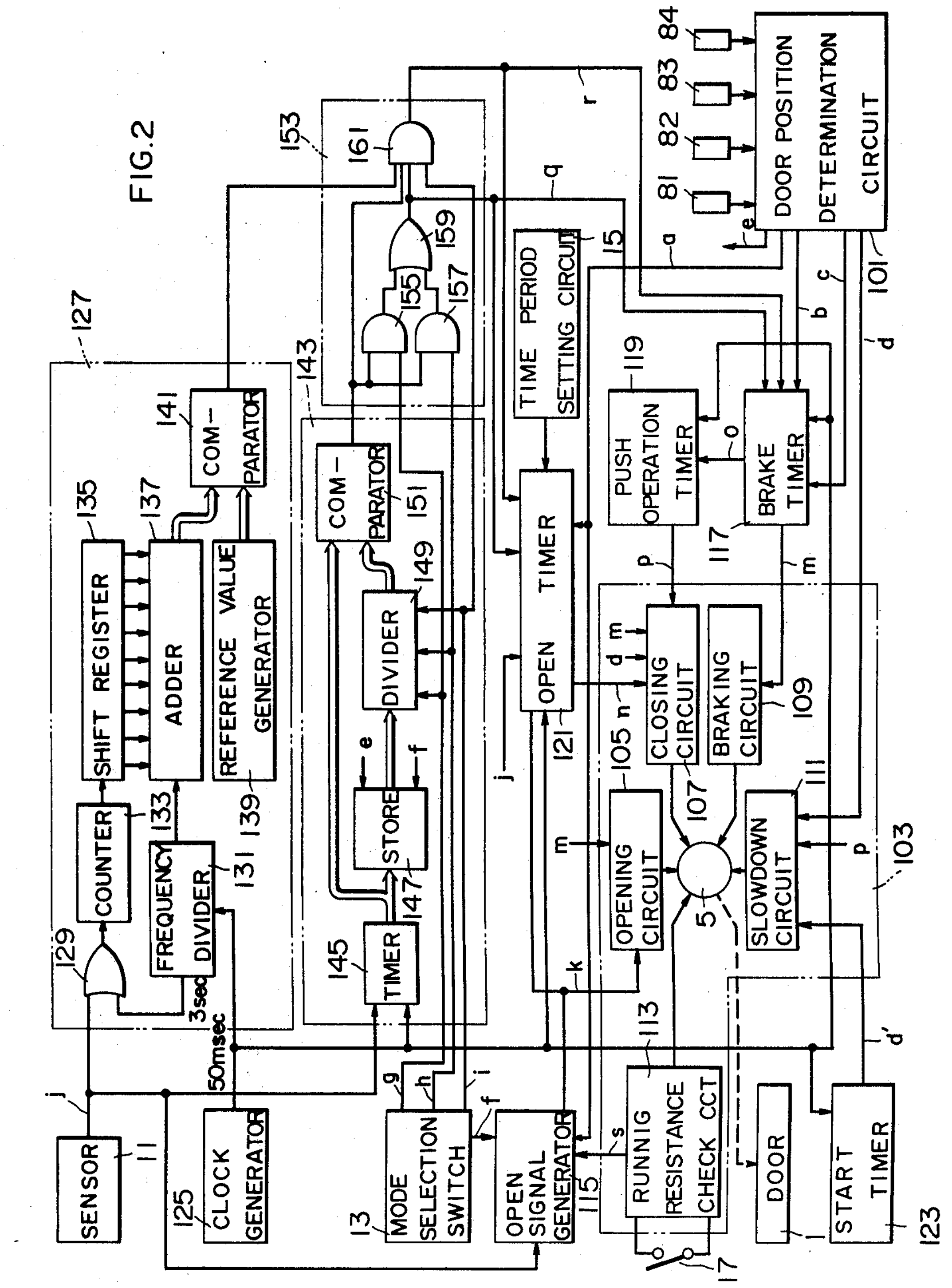
FIG. 2 is a block diagram showing one embodiment of the present invention.

FIG. 2 is a block diagram showing one embodiment of the present invention. The signals obtained from the reed switches 81 to 84 are applied to a door position determining circuit 101. The door position determining circuit 101 comprises a combination of flip-flops, not shown, and stores the respective state, i.e. the on or off states of the reed switches 81 to 84. Thus, the position of the door 1 at the present time is determined as identified by the reed switches 81 to 84. The door position determining circuit 101 provides a full-opening signal a, braking signals b and c and a slowdown signal d. The full-opening signal a is applied to an open timer 121 and an open signal generator 115, which are described subsequently. The braking signals b and c are applied to a brake timer 117 and the slowdown signal d is applied to a slowdown circuit 111 included in a motor control circuit 103. The flip-flops, not shown, included as a combination in the door position determining circuit 101 are reset responsive to a closing operation immediately after turning on of a power supply, to be described subsequently. The motor control circuit 103 comprises a motor 5, an opening circuit 105, a closing circuit 107, a braking circuit 109, a slowdown circuit 111 and a running resistance check circuit 113. A detailed structure of the motor control circuit 103 will be described subsequently with reference to FIG. 3.

A brake timer 117, a push operation timer 119, an open timer 121, a start timer 123 and a timer 145 included in a time period calculating circuit 143 are connected to receive a clock pulse obtained from a clock generator 125. The clock pulse obtained from the clock generator 125 has a period of 50 milliseconds, for example, and the timers 117, 119, 121, 123 and 145 comprise a counter, not shown, for counting such clock pulse responsive to an applied trigger signal. More specifically, the brake timer 117 is responsive to the signal q or r from a mode determining circuit 153 and a signal b or c from the door position determining circuit 101 to be triggered thereby to determine a braking operation time period, for example, 1 second. The push operation timer 119 is responsive to termination of the slowdown operation after the termination of the signal m from the brake timer 117, i.e. is responsive to generation of the signal o to be triggered, thereby to determine the time period of, for example, 1 second for the push operation which is the final step in the closing operation. The open timer 121 counts a predetermined time period from the time point where the detection signal j from a sensor 11 becomes absent after the door 1 is previously opened responsive to the signal k, thereby to maintain the door 1 in the opened state for the predetermined time period. The timer time period of the open timer 121 may be arbitrarily set to say 0 second, 1 second, 2 seconds or 3 seconds by means of the timer time period setting circuit 15. To that end, the timer time period setting circuit 15 comprises a switch manually operable and selectable to a plurality of positions, so that the timer time period of the open timer 121 may be set to a desired length by selecting the switch. Meanwhile, the setting circuit 15 may be a variable setter such as a digital switch. Meanwhile, the start timer 123 is triggered responsive to the rise of the source voltage immediately after turning on of a power supply, not shown, and the slowdown circuit 111 is operated thereafter for a predetermined time period say 1 second, whereby the motor 5 is subjected to a slowdown operation. The signal m from the brake timer 117 is applied to the braking circuit 109 and also to the opening circuit 105 and the closing circuit 107 as a disabling signal, while the signal p from the push operation timer 119 is applied to the closing circuit 107 and is also applied to the slowdown circuit 111. The open timer 121 also receives the signals q and r from the mode determining circuit 153 and the timer signal n obtained therefrom is applied to the opening circuit 121 and is also applied to the closing circuit 107. The signal d' from the start timer 123 as well as the signal d from the door position determining circuit 101 is applied to the slowdown circuit 111. The timer 145 is aimed to determine the lapse time period in the opening operation of the door 1.

The clock from the clock generator 125 is further applied to a frequency divider 131 included in the passing person number determining circuit 127, where the clock is frequency divided into a signal per every 3 seconds.

Although not shown in FIG. 1, the sensor 11 is provided in front of and in rear of the door 1 and is aimed to detect proximity and passage of persons to and by the door 1. The sensor 11 may be a well-known sensor such as an ultrasonic sensor, an infrared radiation sensor or the like. The detection signal j from the sensor 11 is applied to the passage person number determining circuit 127 and is also applied to the above described timer 145 as a trigger signal. The signal j from the sensor 11 is applied to an open signal generator 115. The open signal generator 115 is responsive to the detection signal j from the sensor 11 or the signal s obtained from the running resistance check circuit 113 to provide a signal k accordingly. The signal k serves as a control signal of a switch contact included in the opening circuit 105. The open signal generator 115 may be implemented as a gate circuit such as a buffer gate.

The detection signal j from the sensor 11 is applied to one input of an OR gate 129 included in the passage person number determining circuit 127. The other input of the OR gate 129 is connected to receive the output of the frequency divider 131 included in the circuit 127. As described previously, the frequency divider 131 frequency divides the clock obtained from the clock generator 125 to provide a pulse at every 3 seconds. The output of the OR gate 129 is applied to the counter 133 and the output of the counter 133 is applied to a shift register 135. The shift register 135 may be of nine stages, for example, each stage output being applied to an adder 137 in a parallel fashion. The adder 137 is responsive to a signal at every 3 seconds obtained from the frequency divider 131 to perform an adding operation. Accordingly, the sum of the addition by the adder 137 represents the content as counted in the counter 133 in the past 30 seconds from that timing point at every 3 seconds. Since the counter 133 counts the detection signal j from the above described sensor 11, the result of addition by the adder 137 substantially represents the number of persons passing by the door 1 detected by the sensor 11. The result of addition by the adder 137 is applied to one input of the comparator 141 while the other input of the comparator 141 is connected to receive the reference value data obtained from a reference value generator 139. The comparator 141 provides a signal in the case where the result of addition by the adder 137, i.e. the number of passing persons in the past 30 seconds is smaller than the reference value. The output from the comparator 141 is applied to one input of an AND gate 161 included in the mode determining circuit 153. The other input of the AND gate 161 is supplied with the signal h for an "automatic" mode obtained from the mode selection switch 13. Accordingly, the output from the passage person number determining circuit 127 and thus the output of the comparator 141 is enabled only when the automatic mode is set by means of the mode selection switch 13.

The above described timer 145 is included in a time period calculating circuit 143. The time period calculating circuit 143 is adapted to store in advance a time period required for a "full-opening" operation of the door 1 and makes comparison of the time period required for a full-opening operation as stored and the current time period in the opening operation, thereby to determine a stop timing associated with a "half-opening" or "¾-opening" mode selected by the mode selecting switch 13. More specifically, the timer 145 receives at one input the clock pulse from the clock generator 125 every 50 milliseconds and also receives at the other input the detection signal j from the sensor 11. The timer 145 is triggered by the detection signal j and determines a time period in accordance with the clock, while the determined time period data is applied to the storing circuit 147 and is also applied to one input of the comparator 151. The storing circuit 147 stores the time period data required for full-opening determined by the timer 145 and the same is applied to a divider 149. To that end, the storing circuit 147 is supplied with the signal e from the door position determining circuit 101 and the signal i corresponding to the full-opening mode obtained from the mode selection switch 13. Accordingly, the storing circuit 147 stores only the time period required from the start of the opening of the door to the end of the opening operation in the full-opening mode. The divider 149 receives the signals f, g and h corresponding to the respective modes, i.e. "half-opening", "¾-opening" and "automatic" from the mode selection switch 13. The divider 149 evaluates a time period of an opening operation of the door required for the respective modes based on the dividing coefficients associated with the modes corresponding to these signals f, g and h. The required time period data thus evaluated and corresponding to the set mode is applied to the other input of the comparator 151 as a target time period. One input of the comparator 151 is supplied with the lapse time period obtained from the timer 145. Accordingly, the comparator 151 makes comparison of the target time period and the lapse time period at each mode, and on coincidence thereof, the output therefrom is applied to the mode determining circuit 153. Thus, one feature of the present invention is to calculate the time period in each mode and to control the opening operation of the door 1 as per the above described time period. The mode determining circuit 153 comprises three AND gates 155, 157 and 161 and an OR gate 159. One input of each of the AND gates 155 and 157 is supplied with the output from the above described time period calculating circuit 143 and thus the output from the comparator 151. The other input of the AND gate 155 is supplied with the signal f corresponding to the half-opening mode obtained from the mode selection circuit 13 while the other input of the AND gate 157 is supplied with the signal g corresponding to the ¾-opening mode obtained from the mode selection circuit 13. Accordingly, the AND gate 155 or 157 provides the output when the output is obtained from the comparator 151 when the mode set by the mode selection circuit 13 is "half-opening" or "¾-opening", whereupon such outputs are applied to the OR gate 159. The output from the OR gate 159 is applied to the brake timer 117 as the stop signal q and is also applied to the open timer 121 and is further applied to one input of the above described AND gate 161. Furthermore, the output of the AND gate 155 is applied to the remaining input of the AND gate 161. The output of the AND gate 161 is also applied to the brake timer 117 as a stop signal r and is also applied to the open timer 121.

The mode selection switch 13 comprises a manually operable switch such as a slide switch and provides the signal f, g, h or i corresponding to the "full-opening", "half-opening", "¾-opening" and "automatic" mode by selecting the switch contacts thereof. The signal f corresponding to the full-opening mode is applied to the open signal generator 115.

Figure 7:
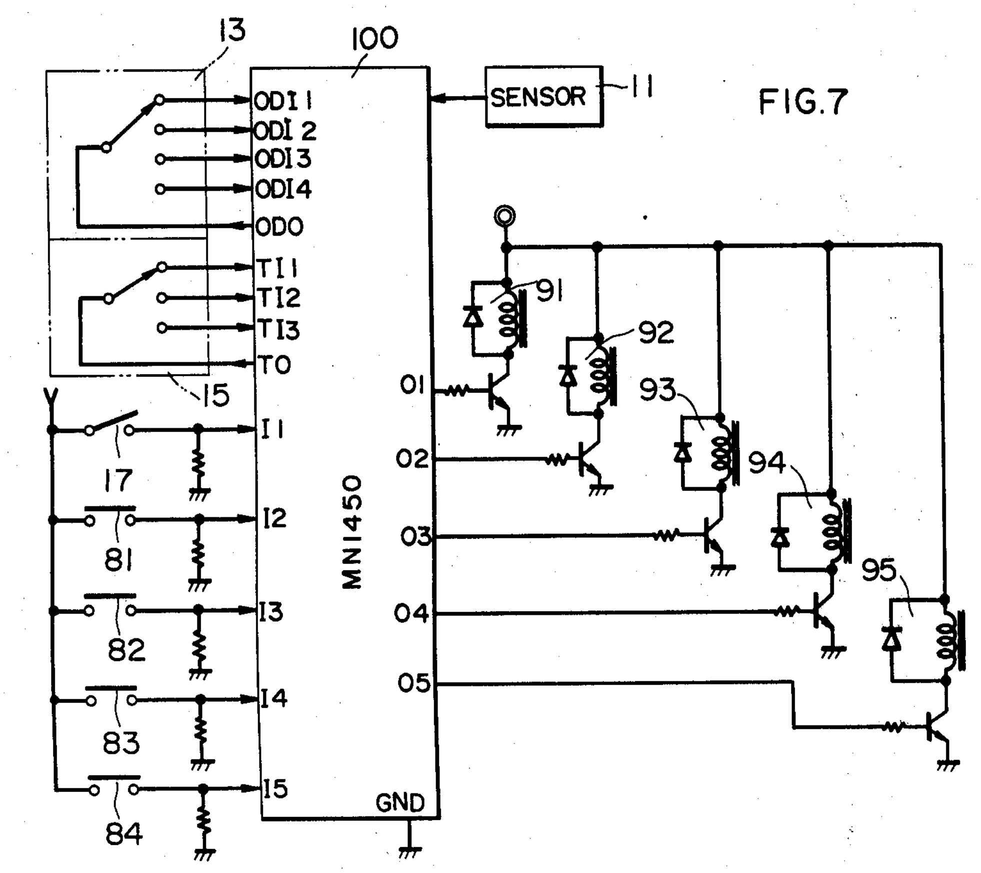
FIG. 7 is a block diagram showing another embodiment of the present invention employing a microprocessor.

Meanwhile, it should be pointed out that the FIG. 2 embodiment may be replaced by a microprocessor as a whole as shown in FIG. 7 and the functions of the respective circuit portions may be implemented by a stored program.

Figure 3:
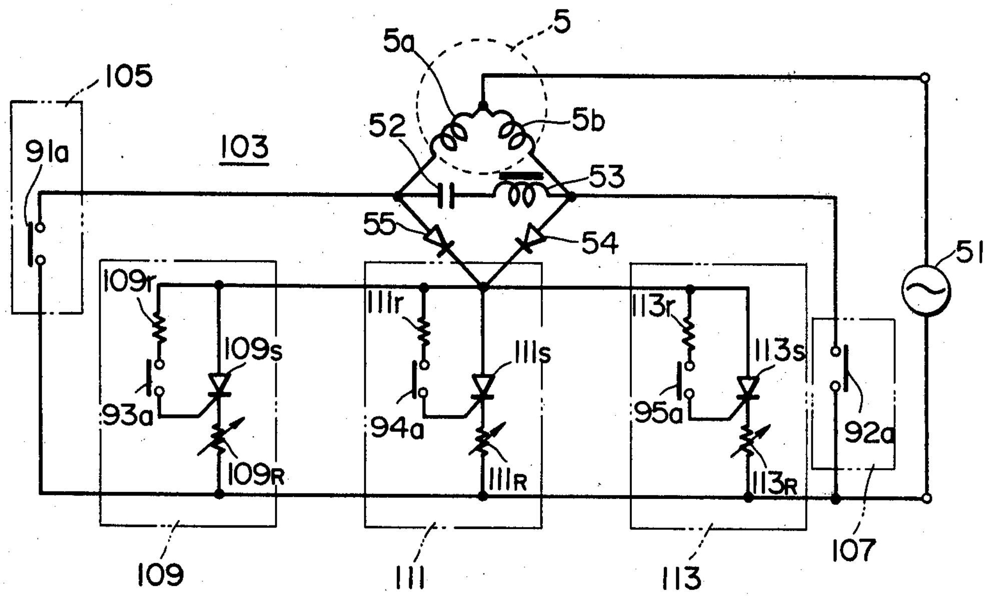
FIG. 3 is a schematic diagram of a motor control circuit.

The motor control circuit 103 is shown in more detail in FIG. 3. The motor 5 comprises armature windings 5*a* and 5*b*, wherein the winding 5*a* function as a main winding while the winding 5*b* functions as an auxiliary winding. One end of each of the main winding 5*a* and the auxiliary winding 5*b* is connected commonly to an alternating current power supply 51 and the other end of each thereof is connected to a switch contact 91*a* included in the opening circuit 105 and the switch contact 92*a* included in the closing circuit 107. A series connection of a starting capacitor 52 and a noise removing choke 53 is connected between the other ends of each of the main winding 5*a* and the auxiliary winding 5*b*. The starting capacitor 52 controls the phase of a current flowing through the main winding 5*a* and the auxiliary winding 5*b*, thereby to determine the rotational direction of the motor 5. More specifically, if the current flowing through the main winding 5*a* is advanced with respect to the current flowing through the auxiliary winding 5*b*, the motor 5 rotation is in the positive direction, whereas conversely if the current flowing through the auxiliary winding 5*b* is advanced as compared with the current flowing through main winding 5*a*, the motor 5 rotation is in the reverse direction. Thus, the motor 5 is driven by the alternating current power supply 51 to be rotated in the positive direction upon closing of the switch contact 91*a* included in the opening circuit 115, while upon closing of the switch contact 92*a* included in the closing ciruit 107 the motor 5 is rotated in the reverse direction upon being supplied by the alternating current power supply 51. When the motor 5 is in the positive rotation mode, the door 1 is moved in the opening direction, whereas when the motor 5 is in the reverse rotation mode the door 1 is moved in the closing direction.

The other ends of the main winding 5*a* and the auxiliary winding 5*b* are connected to the braking circuit 109, the slowdown circuit 111 and the running resistance check circuit 113 disposed in parallel through the corresponding diodes 54 and 55. The braking circuit 109, the slowdown circuit 111 and the running resistance check circuit 113 each comprise thyristors 109*s*, 111*s* and 113*s*. Series connections of the resistors 109*r*, 111*r* and 113*r* and the switch contacts 93*a*, 94*a* and 95*a* are connected between the gates of the thyristors 109*s*, 111*s* and 113*s* and the positive potential line in terms of the direct current. Variable resistors 109R, 111R and 113R are each connected in series with the thyristors 109*s*, 111*s* and 113*s*, respectively. As an example of the braking circuit 109, when the switch contact 93*a* is turned on, the current from the alternating current voltage source 51 is half-wave rectified by means of the diodes 54 and 55 and the output is applied to the gate of the thyristor 109*s* through the resistor 109*r* and the switch contact 93*a*, whereby the thyristor 109*s* is turned on. The fact that the thyristor 109*s* is turned on indicates that a direct current flows through the main winding 5*a* and the auxiliary winding 5*b* through the variable resistor 109R and accordingly a so-called electromagnetic brake is applied to the motor 5 and as a result the motor 5 is brought to a stop when any of the switch contacts 91*a* and 92*a* are turned off. When the slowdown circuit 111 or the running resistance check circuit 113 are operated, the switch contact 91*a* or 92*a* has been turned on and therefore the rotational speed of the motor 5 is merely decreased by means of the above described electromagnetic braking. The switch contacts 91*a*, 92*a*, 93*a*, 94*a* and 95*a* are turned on or off responsive to the signal k from the open signal generator 115, the signal n from the open timer 121 or the signal p from the push operation timer 119, the signal d from the door position determining circuit 101 or the signal d' from the start timer 123 or the signal p from the push operation timer 119, the signal m from the brake timer 117 and the signal associated with the operation of the running resistor check switch 17, respectively.

Meanwhile, in the motor control circuit 103 the electromagnetic braking force acting upon the motor 5 may be adjusted by adjusting the current level, i.e. the power of the direct current flowing through the corresponding thyristor 109*s*, 111*s* or 113*s* by means of the variable resistor 109R, 111R or 113R. For the purpose of adjusting such electromagnetic braking force, a phase control circuit for adjusting an igniting phase of the thyristors may be employed in place of the above described power control circuit.

Now the operation of the FIG. 2 embodiment will be described in detail with reference to FIGS. 1 and 3 to 6. In the following, first an ordinary operation will be described and then an initial operation immediately after turning on of the power supply and a running resistance check operation will be described.

Figure 4:
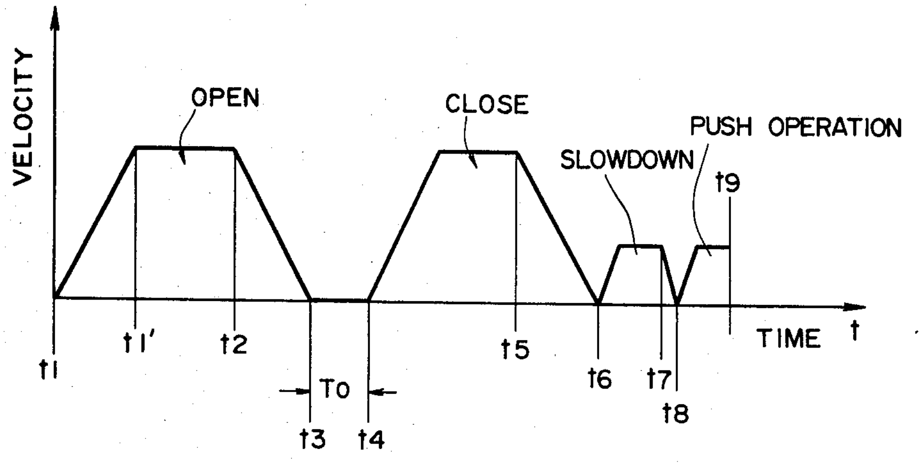
FIG. 4 is a graph for explaining a series of opening and closing operations in a full-opening mode, wherein the abscissa indicates the lapse time period while the ordinate indicates the moving velocity of the door.
Figure 5:
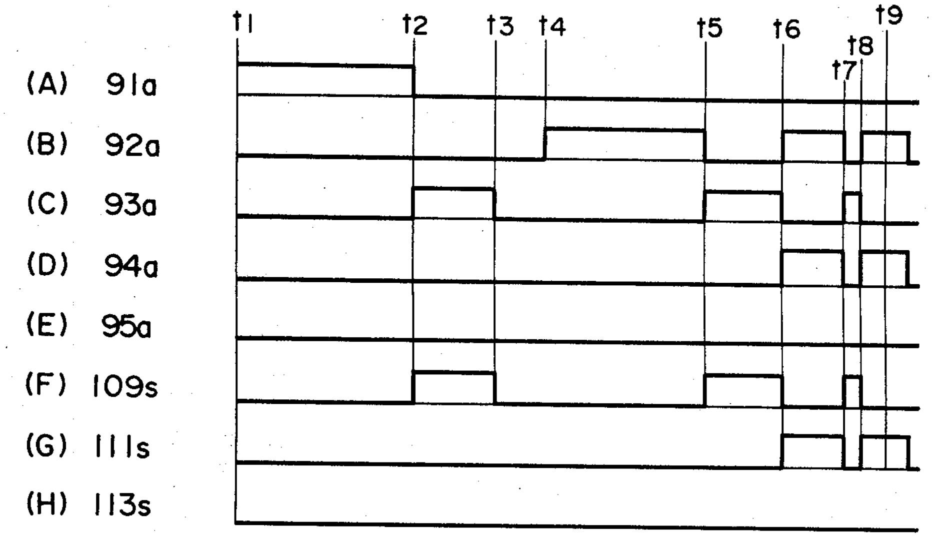
FIG. 5 is a timing chart for explaining the operation of the embodiment with simultaneous reference FIG. 4.

First an ordinary operation of the embodiment will be described. Let it be assumed that the mode selecting switch 13 has been set to "full-opening". When the detection signal j is outputted from the sensor 11 in the full-opening mode, accordingly the signal k is obtained from the open signal generator 115. The switch contact 91*a* of the opening circuit 105 included in the motor control circuit 103 is responsive to the signal k to be turned on, as shown at the timing t1 in FIG. 5. When the switch contact 91*a* is turned on, a current flows from the alternating current voltage source 51 through the main winding 5*a* and the switch contact 91*a* and a current also flows through the auxiliary winding 5*b*, and choke coil 53, the starting capacitor 52 and the switch contact 91*a*. Since the current flowing through the main winding 5*a* is advanced as compared with the current flowing through the auxiliary winding 5*b*, the motor 5 is rotated in the positive direction. Accordingly, the door 1 is moved in the opening direction, as shown in FIG. 4. When the door 1 starts movement in the opening direction, the reed switch 81 is turned on as a function of the magnet 8 moving together with the door 1 and then the reed switch 82 is turned on in the same manner. The door 1 is further moved in the opening direction and the reed switch 83 is turned on at the timing t2. Accordingly, the stop signal b is obtained from the door position determining circuit 101. The brake timer 111 is responsive to the signal b when triggered and the brake timer 117 provides the signal m for a predetermined time period, say 1 second. The switch contact 93*a* included in the braking circuit 109 is responsive to the signal m as shown in FIG. 5. Accordingly, a gate voltage is applied from the alternating current voltage source 51 through the resistor 109*r* and the switch contact 93*a* and the thyristor 109*s* is turned on. As the thyristor 109*s* is turned on, a direct current determined by the variable resistor 109R flows through the main winding 5*a* and the auxiliary winding 5*b* of the motor 5 and through the diodes 54 and 55. Thus a so-called electromagnetic braking is applied to the motor 5 during the time period of the signal m, i.e. during the time period from the timing t2 to the timing t3, as a function of the direct current flowing through the motor 5. On the other hand, the switch contact 91*a* of the opening circuit 105 is responsive to the signal m to be turned off. Accordingly, the rotational speed of the motor 5 is descreased and the door 1 is brought to a stop in a short time period.

When the detection signal j from the sensor 11 is not present, the open timer 121 is triggered, subject to the fact that previously the signal k had been obtained. The open timer 121 determines any arbitrary time period set by the timer time period setting circuit 15, say a time period of 0 second, 1 second, 2 seconds or 3 seconds. When the open timer 121 determines such arbitrary predetermined time period To, the signal n is obtained from the timer 121 at the timing t4. The signal n is applied to the closing circuit 107 included in the motor control circuit 103. The switch contact 92*a* included in the closing circuit 107 is responsive to the signal n to be turned on. Thus, the door 1 is responsive to the detection signal j of the sensor 11 to conduct an opening operation and in the absence of the detection signal j maintains an opened state of the door 1 a predetermined time period To, a function of the open timer 161. When the switch contact 92*a* is turned on, a current flows from the alternating current voltage source 51 through the main winding 5*a*, the starting capacitor 52, the choke coil 53 and the switch contact 92*a* and a current also flows through the auxiliary winding 5*b* and the switch contact 92*a*. Since the current flowing through the auxiliary winding 5*b* is advanced compared with the current flowing through the main winding 5*a*, the motor 5 starts a reversed rotation from the timing t4. Accordingly, the door 1 starts a closing operation from the timing t4 as shown in FIG. 4.

As the door 1 moves in the closing direction, first the reed switch 84 is turned on and then the reed switch 83 is turned on. When the door 1 further travels in the closing direction, the reed switch 82 is then turned on at the timing t5. Accordingly, the stop signal c is obtained from the door position determining circuit 101 and the brake timer 117 is triggered, whereupon the signal m is obtained from the timer 117 for a predetermined time period, say 1 second. As described previously, the switch contact 93*a* included in the braking circuit 107 is responsive to the signal m to be turned on and the switch contact 92*a* included in the closing circuit 107 is responsive to the signal m to be turned off. Accordingly, electromagnetic braking is applied to the motor 5.

When the signal m from the brake timer 117 becomes absent, the slowdown signal d is obtained from the door position determining circuit 101. Accordingly, the switch contact 92*a* included in the closing circuit 107 is turned on and the switch contanct 94*a* included in the slowdown circuit 111 is turned on. A current starts flowing through the windings 5*a* and 5*b* from the alternating current voltage source 51 in response to the turning on of the switch contact 94*a*, thus turning on the thyristor 111*s*, whereby a direct current determined by the variable resistor 111R flows through the diodes 54 and 55 to the motor 5. Accordingly, the motor 5 is energized with the electromagnetic braking applied and the motor 5 starts rotating at a low rotational speed, whereby the door 1 starts movement at the slowdown speed in the closing direction at the time t6 as shown in FIG. 4. As the door 1 travels at the slowdown speed, the reed switch 81 is turned on at the time t7. Accordingly, the stop signal c is obtained from the door position determining circuit 101 and the brake timer 117 provides the signal m for a predetermined time period, say 1 second. The switch contact 92*a* is again turned off responsive to the braking signal m and the switch contact 93*a* included in the braking circuit 111 is turned on responsive to the braking signal m, whereby the motor 5 is braked. When the signal m from the brake timer 117 becomes absent at the timing t8, then the signal o is obtained from the brake timer 117.

The push operation timer 119 is triggered at the timing t8 responsive to the signal o and the signal p is obtained from the timer 119 for a predetermined time period, say 1 second. The signal p is applied to the slowdown circuit 111 and is also applied to the closing circuit 107. Accordingly, the switch contact 92*a* included in the closing circuit 107 is turned on responsive to the signal p and the switch contact 94*a* included in the slowdown circuit 111 is turned on responsive to the signal p, whereby the motor 5 is rotated in the reverse direction at a low rotation speed. Accordingly, the door 1 is moved in the closing direction at a slowdown speed to reach a full-closed state at the timing t9. The time period between the timing t8 to the timing t9 is a so-called push operation period. When the door 1 is brought to a full-closed state as described above, the door position determining circuit 101 resets all the flip-flops, not shown, included therein, thereby to enter into a stand by state.

Now description will be made of a case where the detection signal j is obtained from the sensor 11 in the course of the above described series of closing operations. First in the case where the detection signal j is obtained during a time period after the timing t4 to the timing t5, i.e. a time period until the reed switch 82 is turned on, the signal k is obtained from the open signal generator 15 responsive to the signal j. At the same time the slowdown signal d is obtained from the door position determining circuit 101. The switch contact 91*a* included in the opening circuit 105 is turned on responsive to the signal k and the switch contact 94*a* included in the slowdown circuit 111 is turned on responsive to the signal d. Accordingly, the motor 5 is again rotated in the positive direction at the slowdown speed and the door 1 is moved again in the opening direction at the slowdown speed. Accordingly, the door 1 is again brought to a full-opened state and thereafter the switch contact 92*a* included in the closing circuit 107 is turned on and the switch contact 91*a* is turned off responsive to the signal n from the timer 121, whereby the door 1 starts movement again in the closing direction at a normal speed.

Now consider a case where the detection signal j is obtained from the sensor 11 after the reed switch 82 is operated and the braking circuit 109 is operated after the timing t4, i.e. after the timing t5. In such a case, the signal k is obtained from the open signal generator 115 responsive to the signal j and the signal d is obtained from the door position determining circuit 101. Accordingly, in such a case the door 1 is again moved in the opening direction at the slowdown speed as in the above described case and after the door 1 is brought to a full-opened state the same is again moved in the closing direction at a normal speed.

When the detection signal j is obtained from the sensor 11 during a time period from the timing t6 to the timing t9, the signal k is obtained from the open signal generator 115 responsive to the signal j and at the same time the slowdown signal d is obtained from the door position determining circuit 101, whereby the door 1 is moved in the opening direction again at the slowdown speed and, after the same is brought to a full-opened state, the same is again closed.

On the other hand, in the above described full-opening mode, the time period after the door starts opening until the same finishes opening, i.e. the time period from the timing t1 to the timing t2 is determined by the timer 145 included in the time period calculating circuit 143. The time period data required for the opening operation measured by the timer 145 is stored in the storing circuit 147 and the time period data stored therein is utilized in the half-opening mode or the ¾-opening mode later on.

Now consider a case where the half-opening mode is set by the mode selection switch 13. In such a case, when the detection signal j is obtained from the sensor 11, the signal k is obtained from the open signal generator 115 and, as in the above described case, the motor 5 rotates in the positive direction at the normal speed and the door 1 starts movement in the opening direction. As the door 1 starts the opening operation, the timer 145 starts measurement of the time period. On the other hand, the signal g is obtained from the mode selection switch 13 corresponding to the half-opening mode and the signal g is applied to the divider 149. The divider 149 makes a dividing operation of the time period required for the opening operation in the full-opening mode stored previously in the storing circuit 147 by a predetermined division coefficient (in this case substantially 2) associated with the signal g. Accordingly, the result of calculation or the quotient obtained from the divider 149 represents a time period required for the half-opening operation and the same is applied to the comparator 151 as the target time period. The timer 145 continues measurement of the time period and the time period data is applied to the comparator 151 from time to time. The comparator 151 makes a comparison of the target time period from the divider 149 with the lapse time period of the current opening operation. When coincidence between the signals is obtained from the comparator 151 as comparator output is produced. Since the signal g has been obtained from the mode selection switch 13, at that time, the output signal is obtained from the AND gate 155 included in the mode determining circuit 153. The output from the AND gate 155 is applied through the OR gate 159 as the stop signal q to the open timer 121 and is also applied to the brake timer 117. The brake timer 117 is triggered responsive to the signal q and the signal m is obtained from the timer 117 for a predetermined time period, say 1 second. The switch contact 91*a* included in the opening circuit 105 is turned off and the switch contact 93*a* included in the braking circuit 109 is turned on responsive to the signal m from the brake timer 117, whereupon, as in the previously described case, electromagnetic braking is applied to the motor 5 and accordingly the door 1 is brought to a stop. Thus, in the case where the half-opening mode is set by the mode selection switch 13, the time period required for the half-opening operation is calculated based on the time period required for the full-opening mode previously determined and the motor 5 is brought to a stop based on the thus evaluated time period. Accordingly, a reed switch for detecting the door position for such a half-opening mode is unnecessary.

When the detection signal j from the sensor 11 becomes absent, the open timer 121 is triggered, subject to the presence of the signal q from the mode determining circuit 153, and as in the previously described full-opening mode, the door 1 starts movement in the closing direction after the lapse of a timer time period of the timer 121, i.e. the time period To (FIG. 4). In the course of the movement of the door 1 in the closing direction, the reed switches 82 and 81 are in succession turned on and then the door 1 is brought to a full-closed state as described previously.

Now consider a case where the ¾-opening mode is set by the mode selection switch 13. In such a case, the signal h corresponding to the ¾-opening mode is obtained from the mode selection switch 13 and the same is applied to the divider 149 and is also applied to the AND gate 157. As in the previously described case, the time period calculating circuit 143 calculates a time period required for the opening operation in the ¾-opening mode by means of the divider 149, whereupon the same is applied to the comparator 151 as the target time period. On the other hand, when the motor 5 starts rotation in the positive direction as per the detection signal j from the sensor 11, the timer 145 is triggered to start measurement of the time period and the time period data is applied to the comparator 151 from time to time. Accordingly, the comparator 151 generates an output signal when a time period of substantially ¾ of the time period required for the full-opening operation is measured after the door 1 starts the opening operation. Accordingly, the output is obtained from the AND gate 157 included in the mode determining circuit 153 at that time and the output signal from the AND gate 157 is applied through the OR gate 159 to the open timer 121 and the brake timer 117 as the signal q. The same operation as in the case of the previously described half-opening mode is performed responsive to the signal q. Thus, even in the case of the ¾-opening mode, any reed switches for the opening amount of ¾-opening can be dispensed with and such opening amount can be controlled by merely performing time period calculation by the time period calculating circuit 143.

Now description will be made of a case where the automatic mode is set by the mode selection switch 13. The automatic mode is an operation mode in which the number of persons passing by the door 1 for the past predetermined time period, say 30 seconds is counted, whereupon the opening amount of the door 1 is controlled to "half-opening" or "¾-opening" or "full-opening" depending on the number of persons, thereby to eliminate an undesired full-opened state, thereby to prevent dissipation of energy for air-conditioning to the outside of the building. The number of persons passing for the past time period of 30 seconds is determined by the passing person number determining circuit 127. More specifically, the signal j obtained from the sensor 11 is counted by the counter 133 included in the passing person number determining circuit 127 and the count value is loaded in the shift register 135. The contents in the shift register 135 is added in the adder 137 responsive to the signal at every 3 seconds obtained from the frequency divider 131 included in the circuit 127. As a result, the sum in the adder 137 represents every 3 seconds the number of persons passing by the door 1 for the past time period of 30 seconds. The number of persons passing for 30 seconds is compared with the reference value set in the reference value generator 139 by means of the comparator 141. The reference value generator 139 may be implemented by a well-known digital switch, for example, and accordingly such reference value may be arbitrarily changed.

On the other hand, when the automatic mode is set by the mode selection switch 13, the signal i is obtained from the switch 13. When the detection signal j is obtained from the sensor 11 in the automatic mode, the signal k is obtained from the open signal generator 115 and, as in the previously described case, the motor 5 is rotated in the positive direction at the normal speed, whereby the door 1 starts movement in the opening direction. The divider 149 included in the time period calculating circuit 143 is structured to make division of the time period required for full-opening by the same division coefficient as that of the half-opening mode when the signal i is applied in the embodiment shown. Accordingly, when the time period required for the half-opening mode is measured by the timer 145 after the door 1 starts being opened in the automatic mode, the output is obtained from the comparator 151, as in the previously described half-opening operation. On the other hand, the comparator 141 provides the output when the sum in the adder 137, i.e. the number of persons passing in the past time period of 30 seconds is smaller than the reference value. Accordingly, at the time when the output is obtained from the comparator 151, i.e. when the door 1 is brought to the half-opened state, the stop signal r is obtained from the AND gate 161 of the mode determining circuit 153. The signal r is applied to the open timer 121 and the brake timer 117 and, as in the previously described half-opening mode, the opening amount of the door 1 is controlled to the half-opening amount.

If and when the sum in the adder 137, i.e. the number of persons passing for the past time period of 30 seconds exceeds the reference value, the signal r from the AND gate 161 is removed, whereby the open timer 121 is reset. Accordingly, thereafter the same control as that in the previously described full-opening mode is performed, until the stop signal r is obtained again from the AND gate 161, i.e. the number of persons passing for the past time period of 30 seconds becomes smaller than the reference value. More specifically, in the automatic mode, in the case where the number of persons passing for the past time period of 30 seconds, which is obtained from time to time, is smaller than the predetermined reference value, the half-opening operation is performed in response to the detection signal j obtained from the sensor 11, whereas in the case where the number of persons exceeds the reference value, the full-opening operation is performed in response to the detection signal j obtained from the sensor 11.

Meanwhile, in the automatic mode of the above described embodiment, the opening amount of the door 1 was selected to be controlled to either the half-opening amount or the full-opening amount. However, such opening amount may be set to another arbitrary opening amount such as the ¾-opening amount or the ¼-opening amount. In addition, the opening amount may be selected not in a stepwise manner as described above but to an opening amount which is controlled in a fine, continual or in a non-step manner in response to the number of persons passing for the past predetermined time period.

In the above described embodiment, the automatic mode was set by manual operation of the mode selection switch 13. However, alternatively the past statistics may be investigated to set up a time zone of an increased number of passing persons and a time zone of a decreased number of passing persons and a timer may be provided so that the automatic mode may be selected automatically in the time zone of a decreased number of passing persons.

Furthermore, the shift register 135 included in the passing person number determining circuit 127 may be of any number of stages and accordingly the predetermined past time period to be covered from time to time need not be limited to 30 seconds as in the embodiment but the same may be changed as desired and as necessary as a matter of course.

Although the division coefficient of the divider 149 is determined by selecting the mode by means of the mode selection switch 13, in a further embodiment a manual switch is provided for providing an arbitrary division coefficient to the divider 149, so that not only "half-opening", "¾-opening" or "full-opening" but also any opening amount may be attained by the door 1.

In the above described time period calculating circuit 143 the time period data determined by the timer 145 was first stored in the storing circuit 147 and then division was made by the divider 149. However, the same result may be attained by dividing the time period data from the timer 145 by means of the divider 149 and then by storing the same in the storing circuit 147.

In the above described embodiment, when the opening amount of the door 1 is controlled to "half-opening" in the half-opening mode or the automatic mode, the door 1 starts moving in the closing direction after the lapse of the predetermined time period To (FIG. 4) after disappearance of the detection signal j from the sensor 11; however, if and when the detection signal j is obtained from the sensor midway, the door 1 is brought to the full-opened state irrespective of the half-opening mode. Therefore, even a person who is used to a conventional automatic door which is adapted to be fully opened again when the detection signal j is obtained while the door is closed has no strange feeling to the automatic door of the embodiment. Although the door 1 is stopped when the same is opened by a predetermined opening amount on the occasion of "half-opening" or "¾-opening", even in such case the reed switch for detecting the full-opened state is not disabled and thefefore, even if the door 1 is forced to a full-opened state by an abnormal load, the door 1 is stopped similarly to the above described full-opening mode by means of the reed switch 84, with the result that the door 1 is prevented from being damaged and is therefore reliable.

Now the initial operation after installation of the door will be described. After the door 1 is installed, a power supply is turned on. At that time the state of the flip-flops, not shown, included in the door position determining circuit 101 are unstable. Accordingly, if and when the detection signal j is obtained from the sensor 11 in such situation, the signal k from the open signal generator 115 is applied to the motor control circuit 103, whereas in the absence of the detection signal j from the sensor 11 the signal n from the open timer 121 is applied to the motor control circuit 103. When the signal k is applied to the opening circuit 105, the corresponding switch contact 91*a* is turned on, whereby the motor 5 is rotated in the positive direction. Conversely, when the signal n is applied to the closing circuit 107, the corresponding switch contact 92*a* is turned on and the motor 5 is rotated in the reverse direction. In either case, at the same time as the power supply is turned on, the operation is triggered responsive to the rise of the source voltage from the power supply and the start time 123 starts an operation. During a time period when the start timer 123 determines or measures a predetermined time period of say 1 second, the signal d' is obtained from the timer 123. The switch contact 94*a* included in the slowdown circuit 111 is then turned on and the motor 5 is rotated at the number of rotations for slowdown speed. Accordingly, for a predetermined time period after the power supply is turned on, the door 1 is moved in the opening direction or the closing direction at the slowdown speed.

In the absence of the detection signal j from the sensor 11, the reed switch 82 is turned on during the closing operation of the door 1. This is detected by the door position determining circuit 101 and thereafter the ordinary closing operation set forth in the following is performed. Thus, when the reed switch 81 is turned on in response to the closing operation immediately after turning on of the power supply, the storing means included in the door position determining circuit 101 is reset in response thereto. The resetting of the storing means brings the circuit 101 in a stand by state.

Now an operation of the running resistance check circuit 113 will be described. The running resistance check circuit 113 is a circuit for checking whether a trouble exists involving movement of the door 1 such as improper mounting of the door 1 or a foreign object on the rail 2 (FIG. 1). The check switch 17 is turned on for the purpose of a running resistance check. Accordingly, the signal s is applied from the circuit 113 to the open signal generator 115. Accordingly, the signal k is obtained from the signal generator 115 and the switch contact 91*a* is turned on at the timing t11 in FIG. 6 as shown as (A) in FIG. 6. At the same time the switch contact 95*a* included in the circuit 113 is turned on and the thyristor 113*s* is turned on. A direct current determined by the variable resistor 113R flows through the main winding 5*a* and the auxiliary winding 5*b* from the alternating current voltage source 51 through the diodes 54 and 55 as a result of turning on of the thyristor 113*s*. Accordingly, electromagnetic braking is applied to the motor 5 and the torque of the motor 5 is decreased. The motor torque when the circuit 113 is operated is set to the minimum required torque that can move the door 1 smoothly and assuredly in the case where the door 1 is properly installed and no abnormalities are present. By doing so, in the case of improper installation of the door 1 or in the presence of any other abnormalities, the door 1 cannot fully move as a matter of course. Accordingly, in the case where the door 1 does not normally move when the circuit 113 is operated, occurrence of some abnormality can be readily known.

Figure 6:
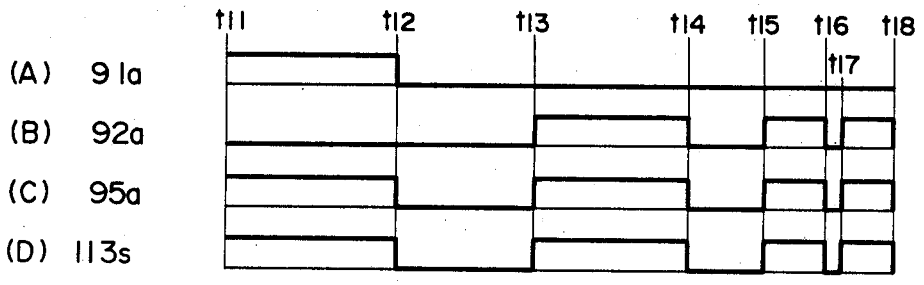
FIG. 6 is a timing chart for explaining a running resistance check operation mode, in particular.

The opening operation is started responsive to the turning on of the switch contacts 91*a* and 95*a* at the timing t11 (FIG. 6). Thereafter the reed switch 83 is turned on. Accordingly, the signal b is obtained from the door position determining circuit 101 and the brake timer 117 is triggered. Accordingly, the braking operation described previously is performed. Thereafter the door 1 is brought to a full-opened state. Then the reed switch 84 is operated. Accordingly, the signal a is obtained from the door position determining circuit 101 and the open timer 121 is triggered at the timing t12 in FIG. 6. The open timer 121 counts the arbitrary time period To set by the timer time period setting circuit 15. Accordingly, the door 1 is kept in an opened state as shown in FIG. 6, during the timer time period To of the open timer 121. When the lapse of the predetermined time period To is detected by the open timer 121 at the timing t13 (FIG. 6), the signal n is applied from the open timer 121 to the closing circuit 107. The switch contacts 92*a* included in the closing circuit 107 are responsive to the signal n to be turned on. The switch 91*a* is turned off at that time. The switch contact 95*a* included in the running resistance check circuit 113 is responsive to the signal n to be again turned on. Then the motor 5 is rotated in the direction for closing the door 1 with the minimum required torque. The reed switch 82 is responsive to the movement of the door 1 in the closing direction to be turned on at the timing t14 in FIG. 6. Accordingly, the switch contacts 92*a* and 95*a* are responsive to the signal c from the door position determining circuit 101 to be turned off. Thereafter during the timings t15, t16, t17 and t18, the switch contacts 92*a* and 95*a* are intermittently turned on as described above for the purpose of the slowdown operation and the push operation, whereby the door 1 is brought to the full-closed state. Thus, since the motor 5 is rotated in either direction with the minimum required torque during the operation of the running resistance check circuit 113, an abnormality such as improper installation of the door can be confirmed in the case where the door 1 is stopped midway in its track.

Meanwhile, preferably the rotation speed of the motor 5 when the running resistance check circuit 113 is operated is selected to be smaller than that when the slowdown circuit 111 is operated. Furthermore, the braking force when the slowdown circuit 111 is operated is selected to be smaller than that when the braking circuit 109 is operated. The braking force when the braking circuit 109 is operated is set such that the movement of the door 1 is fully stopped within the timer time period of the brake timer 117. These adjustments are made using the variable resistors 109R, 111R and 113R included in the respective circuits 109, 111 and 113, respectively.

In the above described embodiment, the slowdown circuit 111 is not operated on the occasion of the movement of the door 1 in the opening direction and the circuit 111 is operated only on the occasion of the closing operation of the door 1. However, as an alternative embodiment, a slowdown operation may be made as in the case of the closing operation after a braking operation in the course of the opening operation of the door 1. More specifically, after the timing t3 in FIG. 4, for example, the signal k is obtained again from the open signal generator 115 as a function of the signal from the door position determining circuit 101. At the same time, the slowdown signal d is applied from the door position determining circuit 101 to the slowdown circuit 111. Accordingly, the switch contact 91*a* included in the opening circuit 105 is turned on and also the switch contact 94*a* included in the slowdown circuit 111 is turned on. Accordingly, the motor 5 is rotated such that the door 1 is moved again in the opening direction at the decreased rotational speed. At the same time as the reed switch 84 is turned on, the brake signal b is obtained from the door position determining circuit 101. Accordingly, the brake timer 117 is triggered and the signal m is obtained for a time period, say 1 second. Accordingly, the switch contact 91*a* included in the opening circuit 105 is turned off and at the same time the switch contact 93*a* included in the braking circuit 109 is turned on. Accordingly, the rotation of the motor 5 is stopped and the door 1 is stopped in a full-opened state. Thus, the slowdown circuit 111 can be operated even in the opening operation of the door 1.

Furthermore, in the above described embodiments, the respective switch contacts 91*a* to 95*a* included in the motor control circuit 103 may be implemented by the contacts of relays which are energized or de-energized by the corresponding signals as in the case of the FIG. 7 embodiment to be described subsequently. In addition, such relays may be replaced by photocouplers including combinations of the light emitting devices and the photoswitching devices.

FIG. 7 is a block diagram showing an outline of a further embodiment of the present invention. The FIG. 7 embodiment employs a microprocessor 100 in place of the circuit configuration of the FIG. 2 embodiment. The microprocessor 100 may be an integrated circuit MN1450 manufactured by Matsushita Electric Industries Ltd. Although the microprocessor 100 is provided with suitable input and output interfaces, in the FIG. 7 microprocessor 100 such have been omitted for facility of illustration. The microprocessor 100 is supplied with a signal obtained from the sensor 11 and is also connected to the mode selection switch 13 and the timer time period setting circuit 15. The mode selection switch 13 can determine which mode has been selected based on which of the input ports ODI1 to ODI4 receive the signals from the output port ODO from the microprocessor 100. Likewise, the timer time period setting circuit 15 can also determine how many seconds the opening time period has been set based on which of the input ports TI1 to TI3 receive the signal from the output port TO. In addition, the input ports I1 and I2 to I5 of the microprocessor 100 are connected to the running resistance check switch 17 and the reed switches 81 to 84, respectively. The output ports O1 to O5 of the microprocessor 100 are connected to the relays 91 to 95 being energized by the suitable driver devices. The contacts of these relays 91 to 95 may be utilized as the respective switch contacts of the motor control circuit shown in FIG. 3. As well-known, the microprocessor 100 is operated in accordance with a program stored in advance and accordingly the operation program of the microprocessor 100 is prepared so as to correspond to the operation of the FIG. 2 embodiment. Such programming can be performed with ease by those skilled in the art of microprocessors and hence a detailed description thereof will be omitted.

In addition, in the above described embodiment the time period from the start of the opening operation to the full-opened state of the door 1 on the occasion of the full-opening mode which is the basis for evaluating the stop time in the respective modes was measured or determined by the timer 145 or the corresponding means, for example. However, the size of the door or the weight of the door is different from door to door and accordingly the time from the start of the opening to the full-opened state of the door 1 is not necessarily the same for all the doors. In addition, such time could be measured as different depending on the starting torque of the motor and the load state of the motor. Accordingly, in a preferred embodiment of the present invention, the time when the motor 5 is being driven at a constant rotational speed is measured. To that end, referring to the FIG. 4 graph, the time from the timing t1' to the timing t2 is preferably measured. In order to detect the timing t1' the rotational speed of the motor 5 itself may be detected and more simply the signal from the reed switch 82 obtainable in the opening operation of the door 1 may be utilized.

In addition, in the above described embodiment a plurality of reed switches were employed in order to identify or determine the door position. However, hall effect devices may be substituted for such reed switches and alternatively any other position detecting means may be employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an automatic door comprising:

motor means for driving said door to thereby open and close said door;

sensor means for detecting the presence of traffic for passage through said door and producing a detection signal upon detection thereof;

control means responsive to said detection signal for controlling said motor means to open said door, said means for controlling including, lapse time period determining means for calculating the time lapse between the start and the end of the period of time required by said motor means to drive said door open, said lapse time period determining means producing an elapsed time signal indicative thereof, full open lapse time storage means responsive to said opening time lapse signal for storing the period of time required to fully open said door, target time period setting means responsive to said full open lapse time storage means for setting a target opening time period a fraction of but no greater than said period of time stored in said full open lapse time storage means comparison means responsive to said lapse time period determining means and said target time period setting means for detecting the coincidence between said target opening time period and said lapse time period and for producing a brake signal upon coincidence thereof, said control means braking said motor to stop said door in an open position upon coincidence thereof;

said door opening to a position which varies according to the ratio between said target opening time period and said period of time stored in said full open lapse time storage means.

2. A control apparatus of an automatic door in accordance with claim 1, which further comprises a plurality of position detecting means for detecting the position of said door means, and slowdown circuit means responsive to the signal from at least one said position detecting means for reducing the rotational speed of said motor.

3. A control apparatus in accordance with claim 1 further comprising position detecting means for detecting the position of said door means and including a plurality of position detecting devices;

said lapse time period determining means being responsive to signals produced by predetermined ones of said plurality of position detecting devices.

4. A control apparatus in accordance with claim 1, wherein said control means further comprises detecting means for detecting whether said door means has been opened to a state determined by said target time period, and closing means responsive to the output from said detecting means for driving said motor such that said door means is driven in said closing direction.

5. A control apparatus in accordance with claim 4, wherein, said closing means comprises timer means for timing a predetermined time period and producing a close signal in response to the absence of the detection signal from said sensor means after said door means is opened to the state determined by said target time period; and maintaining means for maintaining said door means at the predetermined opened state during a timer time period of said timer means.

6. A control apparatus in accordance with claim 5, which further comprises timer time period setting means for setting arbitrarily said timer time period of said timer means.

7. A control apparatus in accordance with claim 1, wherein said predetermined opened state is determined by said target time, said time period setting means comprising traffic passage number responsive setting means for adjusting the target time period in accordance with the number of traffic passages within a predetermined period of time detected by said sensor means.

8. A control apparatus in accordance with claim 7, wherein said traffic passage number responsive setting means includes, count means for counting the detection signals produced by said sensor means, and opening amount changing means for changing said fraction used by said target time period setting means in response to the count value produced by said count means during said predetermined time period.

9. A control apparatus in accordance with claim 1, wherein said control means includes, braking circuit means for stopping rotation of said motor, and enabling means for enabling said braking means responsive to the brake signal produced by said comparison means.

10. A control apparatus in accordance with claim 9, wherein said control means includes slowdown circuit means for decreasing the rate of rotation of said motor when in a predetermined state.

11. A control apparatus in accordance with claim 10, which further comprises means for adjusting a decrease rate of rotation of said motor.

12. A control apparatus in accordance with claim 10, wherein said control means includes running resistance check circuit means for rotating said motor with a rotation rate slower than that generated by said slowdown circuit means.

* * * * *